(12) United States Patent
Wong et al.

(10) Patent No.: US 7,915,863 B2
(45) Date of Patent: Mar. 29, 2011

(54) CHARGE PROTECTION CIRCUIT WITH TIMING FUNCTION

(75) Inventors: Shih-Fang Wong, Taipei Hsien (TW); Tsung-Jen Chuang, Taipei Hsien (TW); Jun-Wei Zhang, Shenzhen (CN)

(73) Assignees: Hong fu Jin Precision Industry (ShenZhen) Co., Ltd., Shenzhen, Guangdong Province (CN); Hon Hai Precision Industry Co., Ltd., Tu-Cheng, New Taupei (TW)

( * ) Notice: Subject to any disclaimer, the term of this patent is extended or adjusted under 35 U.S.C. 154(b) by 493 days.

(21) Appl. No.: 12/143,842

(22) Filed: Jun. 23, 2008

(65) Prior Publication Data
US 2009/0009135 A1    Jan. 8, 2009

(30) Foreign Application Priority Data
Jul. 3, 2007    (CN) .......................... 2007 1 0200985

(51) Int. Cl.
*H02J 7/00* (2006.01)
*G01N 27/416* (2006.01)
*G08B 21/00* (2006.01)

(52) U.S. Cl. ........ 320/134; 320/149; 320/155; 324/426; 324/532; 340/636.1; 340/636.21

(58) Field of Classification Search .................... 320/134
See application file for complete search history.

(56) References Cited

U.S. PATENT DOCUMENTS

| | | | |
|---|---|---|---|
| 6,285,165 B1 * | 9/2001 | Terada .......................... | 320/134 |
| 6,340,880 B1 * | 1/2002 | Higashijima et al. ......... | 320/162 |
| 6,642,694 B2 * | 11/2003 | Yamanaka et al. ............ | 320/134 |
| 6,768,289 B2 * | 7/2004 | Fujiwara ....................... | 320/134 |
| 2006/0164041 A1 | 7/2006 | Ooshita et al. | |

* cited by examiner

*Primary Examiner* — Edward Tso
*Assistant Examiner* — Yalkew Fantu
(74) *Attorney, Agent, or Firm* — Frank R. Niranjan

(57) ABSTRACT

A charge protection circuit with a timing function is disclosed. The circuit includes a charge protection module constituting of a second switch, a second capacitor and a control integrated circuit (IC). The second switch Q2 is switched to turn on or turn off to charge or discharge the lithium-ion battery. The second capacitor configured for setting a delay time of a Ct terminal of the control IC, thus to prevent the battery from being overcharged. The circuit further includes a charge timing circuit configured for predetermining a time threshold value. When the charge time reaches the time threshold value, the charge timing circuit outputs a second high level signal to charge the second capacitor. The second capacitor triggers the control IC to turn off the second switch, thereby terminating the charge of the battery body.

5 Claims, 2 Drawing Sheets

CHARGE PROTECTION CIRCUIT WITH TIMING FUNCTION

BACKGROUND OF THE INVENTION

1. Field of the Invention

The present invention relates to charge protection circuits, and particularly to a charge protection circuit with a timing function.

2. General Background

Many mobile devices employ lithium-ion batteries in their battery packs. The lithium-ion batteries are likely to be damaged in the event of overcharge, overdischarge, and overcurrent. Therefore, battery packs for lithium-ion batteries are provided with battery protection modules including battery protection circuits that prevent lithium-ion batteries from being overcharged, overdischarged, and overcurrent. Such a battery protection circuit has a field effect transistor (FET) chip serving as an electronic switch that opens in response to overcharge, overdischarge, and overcurrent.

FIG. 2 is an exemplary circuit diagram of a conventional battery protection circuit 100. The battery protection circuit 100 includes a lithium-ion battery 1, a charger 2 and a battery protection module 3. The battery protection module 3 includes a control integrated circuit (IC) 31, a first field effect transistor (FET) switch Q1 (hereinafter referred to as "the first switch Q1") and a second field effect transistor (FET) switch Q2 (hereinafter referred to as "the second switch Q2"). The control IC 31 includes a charge control terminal Cout (hereinafter referred to as "the terminal Cout"), a discharge control terminal Dout (hereinafter "the terminal Dout").

The control IC 31 provides an overcharge detection function to turn off the second switch Q2 when an overvoltage is applied to the lithium-ion battery 1 due to some failure during charging, and an overdischarge detection function to turn off the first switch Q1 when the voltage of the lithium-ion battery 1 drops to or below a predetermined voltage.

However, it is difficult to accurately determine whether or not the lithium-ion 1 has been overcharged according to the overvoltage applied on the lithium-ion 1.

Therefore, it is necessary to provide a charge protection circuit with a timing function, which terminates a lithium-ion battery charging process when the charge time reaches a predetermined charge time, thereby preventing the lithium-ion batteries from being overcharged.

SUMMARY OF INVENTION

A charge protection circuit with a timing function is disclosed. The circuit includes a battery protection module which includes a control IC having a overcharge control (Cout) terminal, a charge delay trigger (Ct) terminal, a second capacitor connected with the charge delay trigger terminal, and a second switch connected with the overcharge control terminal. The circuit further includes a timing circuit having a first operational amplifier, a second operational amplifier, and a first capacitor. The output terminal of the first operational amplifier connects to the noninverting input terminal of the second operational amplifier. The second operational amplifier charges the second capacitor.

When the voltage of the noninverting input terminal is higher than that of the inverting input terminal, the output terminal of the first operational amplifier outputs a first high level signal for charging the first capacitor to raise the voltage of the noninverting input terminal of the second operational amplifier. When the voltage of the noninverting input terminal ultimately exceeds a voltage applied to the inverting input terminal, the second operational amplifier outputs a second high level signal to charge the second capacitor, a voltage applied to the Ct terminal of the control IC rises during the charging of the capacitor and signals the control IC to switch off the second switch when the voltage applied to the Ct terminal reaches a predetermined value, thus to prevent a lithium-ion battery connected with the charge protection circuit from being overcharged.

DETAILED DESCRIPTION OF THE EMBODIMENTS

Figure 1:
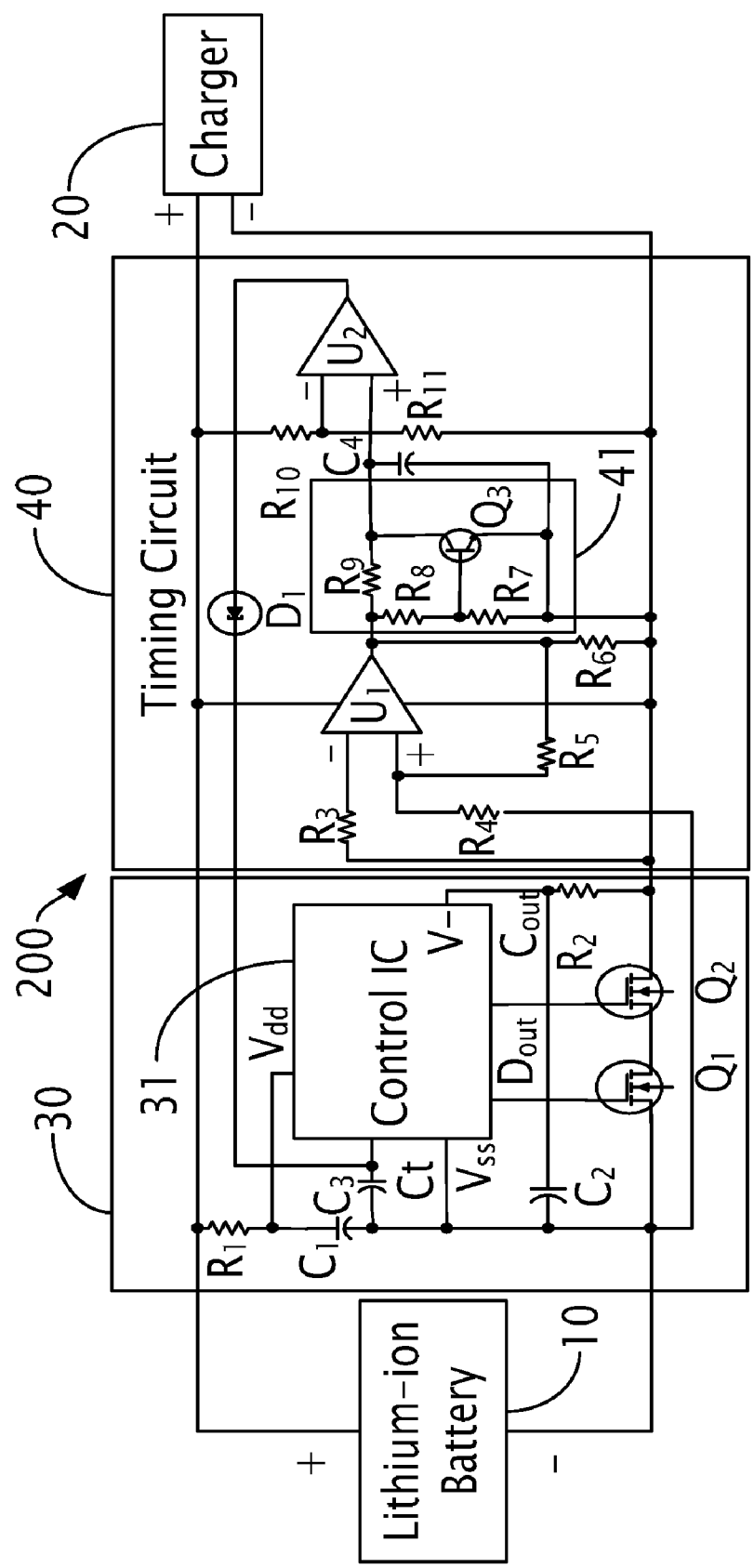
FIG. 1 is a circuit diagram of a charge protection circuit with a timing function in accordance with a exemplary embodiment of the present invention.
Figure 2:
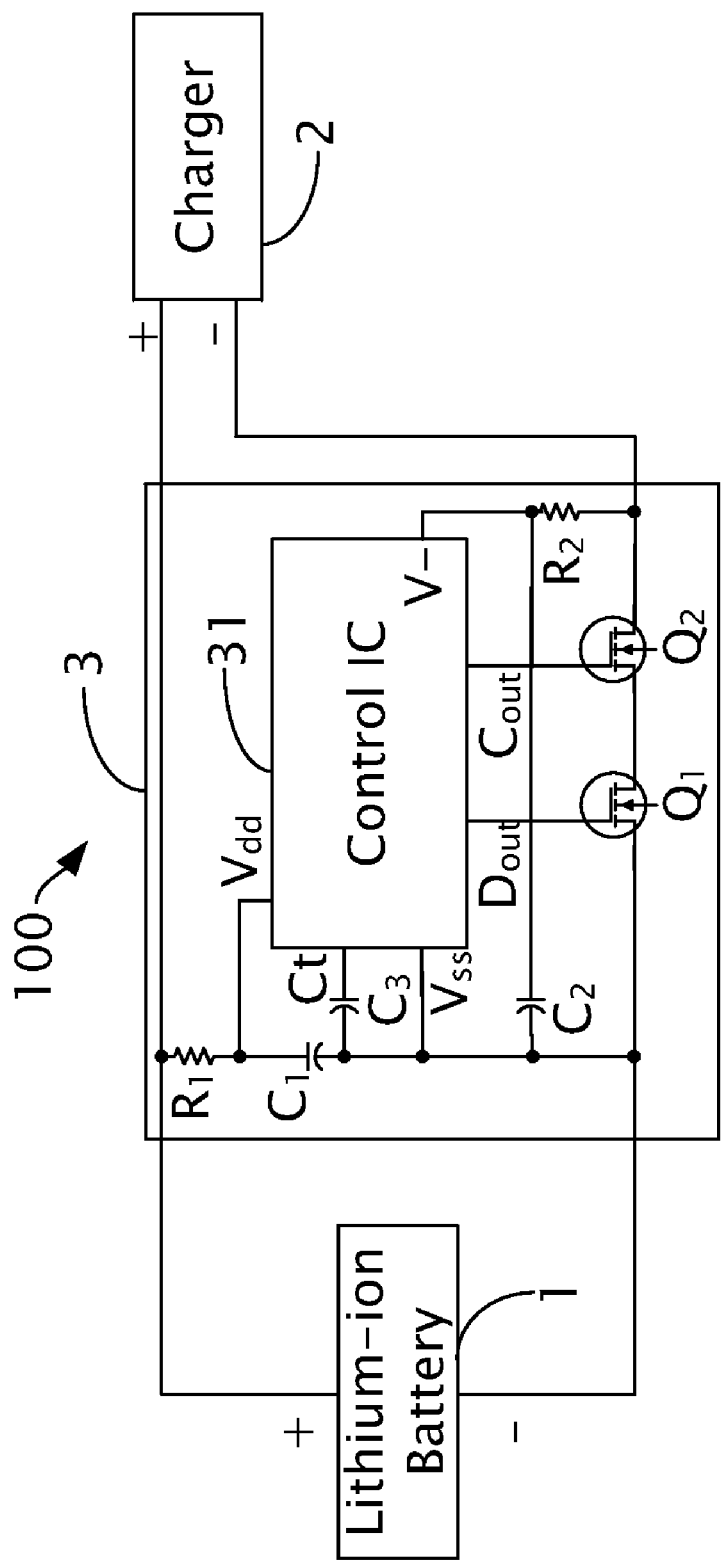
FIG. 2 is a circuit diagram of a conventional battery protection circuit of the related art.

FIG. 1 is a circuit diagram of a charge protection circuit 200 with a timing function in accordance with an exemplary embodiment. The charge protection circuit 200 includes a battery protection module 30 and a timing circuit 40 connected with the battery protection module 30. The charge protection circuit 200 is connected between a lithium-ion battery 10 and the charger 20.

The battery protection module 30 includes a control IC 31, resistors R1 and R2, capacitors C1 and C2, a first switch Q1, and a second switch Q2. The battery protection module 30 further includes a second capacitor C3. The switches Q1 and Q2 may be field effect transistor switches. The switches Q1 and Q2 may otherwise be transistors and others semiconductor switches, in the exemplary embodiment, the switch Q1 and Q2 are illustrated as field effect transistors. The control IC 31 includes an overcharge control (Cout) terminal, a overdischarge control (Dout) terminal, a Vdd terminal, a VSS terminal, a charge delay trigger (Ct) terminal, and a V negative (V−) terminal.

The capacitor C1 is connected between the Vss terminal and the Vdd terminal of the control IC 31. The resistor R1 is connected in series with the capacitor C1 between a positive terminal of the charger 20 and the source terminal of the first switch Q1. The resistor R1 and the capacitor C1 form a circuit for supplying power to the control IC 31. The capacitor C2 is connected between the V− terminal and the source terminal of the first switch Q1. The resistor R2 is connected between the V− terminal of the control IC 31 and a negative terminal of the charger 20. The second capacitor C3 is connected between the Ct terminal of the control IC 31 and the source terminal of the first switch Q1. The Vss terminal is connected to the source terminal of the first switch Q1. The gate terminal and the drain terminal of the first switch Q1 are connected respectively to the Dout terminal of the control IC 31 and the source terminal of the switch Q2. The source terminal of the first switch Q1 is connected to a negative terminal of the lithium-ion battery 10.

The gate terminal and the drain terminal of the second switch Q2 are connected respectively to the Cout terminal of the control IC 31 and the negative terminal of the charger 20. The negative terminal and the positive terminal of the lithium-ion battery 10 are connected respectively with the source terminal of the first switch Q1 and the positive terminal of the charger 20. The negative terminal of the charger 20 is connected to the drain terminal of the second switch Q2.

The timing circuit 40 includes a first operational amplifier U1 (hereinafter referred to as "the U1"), a second operational amplifier U2 (hereinafter referred to as "the U2"), a transistor Q3, a plurality of resistors R3 through R10, a diode D1 and a first capacitor C4. The inverting input terminal of the U1 is connected to the drain terminal of the second switch Q2 through the resistor R3. The noninverting input terminal of the U1 is connected to the source terminal of the first switch Q1 through the resistor R4. The resistor R5 is connected between the noninverting input terminal and an output terminal of the U1, and the resistor R6 is connected between the output terminal of the U1 and the drain terminal of the second switch Q2. The resistor R7 is connected in series with the resistor R8 between the output terminal of the U1 and the drain terminal of the second switch Q2. The resistor R9 is connected between the output terminal of the U1 and a noninverting input terminal of the U2. The resistor R10 is connected in series with the resistor R11 between the positive terminal and the negative terminal of the charger 20.

The inverting input terminal of the U2 is connected between the resistor R10 and the resistor R11, and an output terminal of the U2 is connected to the Ct terminal of the control IC 31 through the diode D1. The gate terminal of the transistor Q3 is connected between the resistors R7 and R8, the emitter terminal and the collector terminal of the transistor Q3 are connected with the drain terminal of the second switch Q2 and the noninverting input terminal of the U2 respectively. The first capacitor C4 is connected between the collector terminal and the emitter terminal of the transistor Q3. The resistors R7, R8 and R9, the transistor Q3 and the connections therebetween form a delay amplifying circuit 41. The delay amplifying circuit 41 and the first capacitor C4 are used for setting a charge time of the lithium-ion battery 10 according to the resistance value of the resistors R7, R8 and R9 and the capacitance value of the capacitor C4.

When the lithium-ion battery 10 is being charged, the control IC 31 detects a charging current and a voltage of the lithium-ion battery 10 through the Vdd terminal and the Vss terminal. If a large current is applied to the lithium-ion battery 10 due to some failure when the battery is being charged, the second switch Q2 is turned off to protect the lithium-ion battery 10 from being overcharged.

A charging current flows through the switches Q1 and Q2 when the battery 10 is being charged. A voltage of the noninverting input terminal of the U1 is higher than that of the inverting input terminal of the U1 because of parasitic resistors existing in the switches Q1 and Q2. The output terminal of the U1 outputs a first high level signal. The first high level signal charges the first capacitor C4. As time passes, a voltage of the gate terminal of transistor Q3 rises and the transistor Q3 is switched on. The transistor Q3 reduces a current to charge the first capacitor C4. A voltage applied to the noninverting input terminal of the U2 rises during the charging of the first capacitor C4 and ultimately exceeds a voltage (for example, a predetermined voltage) applied to the inverting input terminal of the U2. As a result, the U2 outputs a second high level signal to charge the second capacitor C3 via the diode D1. As time passes, a voltage applied to the Ct terminal of the control IC 31 rises as the charging to the first capacitor C3 continues.

The Ct terminal signals the control IC 31 to switch off the switch Q2 when the voltage applied to the Ct terminal reaches a predetermined value, thus to prevent the lithium-ion battery 10 from being overcharged.

The charge protection circuit with a timing circuit of the present invention overcomes the aforementioned shortcoming in a conventional battery protection circuit.

Although the present invention has been specifically described on the basis of an exemplary embodiment thereof, the invention is not to be construed as being limited thereto. Various changes or modifications may be made to the embodiments without departing from the scope and spirit of the invention.

What is claimed is:

1. A charge protection circuit with a timing function for protecting a lithium-ion battery from being overcharged, comprising:
   a battery protection module comprising a control integrated circuit having a overcharge control terminal, a charge delay trigger terminal, a second capacitor connected to the charge delay trigger terminal, and a second Switch controlled to be on or off by the overcharge control terminal; and
   a timing circuit comprising a first operational amplifier, a second operational amplifier, and a first capacitor, wherein the first operational amplifier outputs a first high level signal during charging of the lithium-ion battery to charge the first capacitor, which consequently raise a voltage applied to the second operational amplifier, the second operational amplifier outputs a second high level signal to charge the second capacitor, when the voltage applied thereto exceeds another voltage concurrently applied to the second operational amplifier, the first capacitor raises a voltage applied to the charge delay trigger terminal of the control integrated circuit and signals the control integrated circuit to switch off the second switch when the voltage applied to the charge delay trigger terminal reaches a predetermined value, thereby preventing the lithium-ion battery from being overcharged.

2. The charge protection circuit with a timing function as claimed in claim 1, further comprising a delay amplifying circuit.

3. The charge protection circuit with a timing function as claimed in claim 2, wherein the delay amplifying circuit comprises a transistor and more than one resistor, the first capacitor is connected between the collector terminal and the emitter terminal of the transistor.

4. The charge protection circuit with a timing function as claimed in claim 3, wherein the current of the first capacitor is divided by the transistor during the time the transistor is turned on.

5. The charge protection circuit with a timing function as claimed in claim 3, wherein the first capacitor and the resistors are used for predetermining a charge time.

* * * * *